US007219835B2

(12) United States Patent
Graves et al.

(10) Patent No.: US 7,219,835 B2
(45) Date of Patent: May 22, 2007

(54) CARD ASSEMBLY WITH VERTICAL MAGNETIC STRIPE

(75) Inventors: Phillip Craig Graves, Atlanta, GA (US); Sean Keith Chariker, Alpharetta, GA (US)

(73) Assignee: e2interactive, Inc., Atlanta, GA (US)

( * ) Notice: Subject to any disclaimer, the term of this patent is extended or adjusted under 35 U.S.C. 154(b) by 142 days.

(21) Appl. No.: 11/116,243

(22) Filed: Apr. 28, 2005

(65) Prior Publication Data

US 2005/0247798 A1 Nov. 10, 2005

Related U.S. Application Data

(60) Provisional application No. 60/569,466, filed on May 7, 2004.

(51) Int. Cl.
*G06K 5/00* (2006.01)
(52) U.S. Cl. ...................... 235/380; 235/493
(58) Field of Classification Search ............. 235/380, 235/381, 375, 379, 383; 283/61, 74, 100, 283/101, 62, 67; 206/449, 39
See application file for complete search history.

(56) References Cited

U.S. PATENT DOCUMENTS 3,553,440 A   1/1971   Dale

| | | | | |
|---|---|---|---|---|
| 5,918,909 A | * | 7/1999 | Fiala et al. | 283/61 |
| 6,224,108 B1 | * | 5/2001 | Klure | 283/74 |
| 7,032,817 B2 | * | 4/2006 | Blank | 235/380 |
| 7,063,255 B2 | * | 6/2006 | Algiene | 235/380 |
| 2002/0040935 A1 | | 4/2002 | Weyant | |

FOREIGN PATENT DOCUMENTS

DE   299 24 565 U1   11/2003
GB   2 281 714 A   3/1995

OTHER PUBLICATIONS

European Search Report, Application No. EP 05 10 3788, Jul. 28, 2005, 2 pages.

* cited by examiner

*Primary Examiner*—Thien Minh Le
(74) *Attorney, Agent, or Firm*—Hunton & Williams LLP (57) ABSTRACT

A card assembly comprising a display portion and a transaction card is provided. The display portion comprises a substantially planar substrate. The transaction card comprises a substantially rectangular and substantially planar substrate having first and second short edges and first and second long edges. The transaction card further comprises at least one magnetic stripe having a card identification number encoded thereon. The at least one magnetic stripe is substantially parallel to the long edges. The transaction card is detachably coupled to the display portion at a coupling interface located along one of the short edges. The card assembly may be configured so that the transaction card can be inserted into a card-reading device while the transaction card is still attached to the display portion.

20 Claims, 4 Drawing Sheets

CARD ASSEMBLY WITH VERTICAL MAGNETIC STRIPE

RELATED APPLICATIONS

This application claims priority to U.S. Provisional Application No. 60/569,466 filed May 7, 2004 and entitled "Card Assembly With Vertical Magnetic Stripe," the disclosure of which is incorporated herein by reference in its entirety.

FIELD OF THE INVENTION

This invention relates to card assemblies. More particularly, the invention relates to a card assembly comprising a display portion detachably coupled to a transaction portion.

BACKGROUND OF THE INVENTION

To prevent fraud and theft, transaction cards such as credit cards, debit cards, and stored value cards may be issued in an inactive state, where the card must be activated prior to use. A separate activation step can serve at least two important goals. First, it can ensure that the card is in the possession of the rightful cardholder. For instance, cards may be activated when the rightful cardholder verifies receipt, such as by accessing a central processor (e.g., via phone) and providing personal identification information. Second, activation can ensure that the card has been validly purchased for legitimate value (and not stolen). For instance, a prepaid card may be activated at the time it is purchased for valid funds, e.g., by scanning a barcode or magnetic stripe on a package that contains the card at a point of sale and receiving payment for the card.

After activation, transaction cards may be used to purchase goods and services from merchants. Most transaction cards such as credit cards, debit cards, and stored value cards have a single magnetic stripe that stores magnetically encoded data associated with an account. The magnetic stripe is swiped at merchant terminals in transactions where cardholders access value or credit in the account to purchase goods and services. Typically the magnetic stripe is encoded with data that enables transactions where card account funds are accessed over a communications network such as a credit or debit network. The magnetic stripe may also be encoded only for activation purposes, and the regular functioning of the card may not require a magnetic stripe. For instance, phone cards may display a PIN used for wireless phone calls that is activated by swiping a magnetic stripe on the card; thereafter, the magnetic stripe is not needed to access the value of the PIN.

SUMMARY OF THE INVENTION

In one exemplary embodiment, a card assembly comprising a display portion and a transaction card is provided. The display portion comprises a substantially planar substrate. The transaction card comprises a substantially rectangular and substantially planar substrate having first and second short edges and first and second long edges. The transaction card further comprises at least one magnetic stripe having a card identification number encoded thereon. The at least one magnetic stripe is substantially parallel to the long edges. The transaction card is detachably coupled to the display portion at a coupling interface located along one of the short edges.

In another exemplary embodiment, a method of activating a card assembly is provided. A card assembly is displayed in a merchant store. The card assembly comprises a display portion and a transaction card. The display portion comprises a substantially rectangular and substantially planar substrate and a hanging aperture for hanging the card assembly in a merchant store display. The transaction card comprises a substantially planar substrate having first and second short edges and first and second long edges. The at least one magnetic stripe has a card identification number encoded thereon. The at least one magnetic stripe is substantially parallel to the long edges. The transaction card is detachably coupled to the display portion at a coupling interface located along one of the short edges The card identification number is input into a merchant terminal. The act of inputting comprises inserting the transaction card into a magnetic stripe reader so that at least one of the short edges and at least ¼ of each of the long edges are inside the card reader. The act of inserting occurs while the transaction card is coupled to the display portion. A request to activate the transaction card is passed to a central processor, wherein the request comprises the card identification number to a central processor.

In another exemplary embodiment, a card assembly comprises a display portion and a transaction card. The display portion comprises a substantially planar substrate. The transaction card comprises a substantially rectangular and substantially planar substrate having first and second short edges and first and second long edges. The transaction card further comprises a first machine-readable storage medium comprising a magnetic stripe having a card identification number encoded thereon. The magnetic stripe is substantially parallel to the short edges. The transaction card and the display portion are comprised of substantially the same substrate and are integrally formed as a single planar member. The transaction card is detachably coupled to the display portion at a line of weakness located along one of the short edges. A second machine-readable storage medium is disposed on at least one of the display portion and transaction card and comprising at least one of a magnetic stripe and a barcode.

In another exemplary embodiment, a card assembly comprising a display portion and a transaction portion is provided. The display portion may comprise a substantially planar transaction portion substrate having a first short edge, a second short edge, a first long edge, and a second long edge. The transaction portion may be detachably coupled to the display portion, and it may comprise a substantially planar substrate having a first short edge, a second short edge, a first long edge, a second long edge, and a machine-readable activation storage medium applied thereto. The activation storage medium may have activation data associated with an account stored therein. The display portion and transaction portion may be integrally formed as a single planar member. The display portion may be separable from the transaction portion along a detachment joint. The detachment joint may comprise a line of weakness formed by perforating or scoring the integral planar member. The display portion may further include a restricted-use surface area adjacent to the detachment joint and opposite of the short edge of activation storage medium, such area being free of any machine-readable storage medium (such as a magnetic stripe) that would interfere with the reading of the activation storage medium by a merchant terminal, for example.

One advantage of some embodiments of the invention is that a standard-size transaction card may fit inside card-reading machines (such as traditional ATM-type card readers) while it is still attached to display portion. Such card-insertion type card-reading machines (such as standard ATM machines) often encapsulate cards on three sides of the card when the card is inserted into the machine. For instance, a card may be inserted part-way (or all the way) into such machines, such that only a portion (or none) of the transaction card is physically outside the machine. Such machines are often configured so that only cards of a particular size may be inserted into the machine. The cards are typically inserted short-end first, and the cards typically have a magnetic stripe that runs parallel to the long edge of the card.

Thus, according to some embodiments, a card assembly comprising a transaction portion and display portion may be activated by inserting the transaction card into a merchant card-reading terminal while the display portion is still attached to the transaction card. Accordingly, a merchant may vend a product such as the card assemblies described herein without disturbing the card assembly (e.g., by separating the transaction card from the rest of the card assembly).

In such embodiments, the card assembly may comprise a standard-size transaction card that is attached to a display portion at a short edge of the transaction card. The other short edge of the transaction card (that is not attached to the display portion) may be inserted into a card reader. During insertion, the display portion may remain outside the card reader. The display portion may effectively act like a "handle" for inserting the transaction portion into the card-reading device. Thus, in spite of being attached to a display portion, a transaction card may be read at such card insertion terminals, e.g., in order to activate the card or perform other functions (such as adding value to a card-based account, deactivating an account, etc.). By way of contrast, card assemblies that comprise a display portion attached to a standard transaction card along one of its long sides may be incapable of being inserted into ATM machines and other card insertion readers. The display portion may effectively make the card assembly too wide to be inserted into the card reader, since the card reader is typically configured to accept devices having the dimensions of a regular transaction card (and not a device such as a card assembly having the dimensions of a transaction card plus display portion).

In some embodiments, one or more of the display portion and the transaction portion may have machine-readable media (such as magnetic stripes) that may be readable by one or more different types of card readers, such as card-insertion card readers. For instance, a card assembly may comprise a display portion and a transaction portion, wherein both the display portion and transaction portion may comprise a magnetic stripe that may be inserted into a card-reading device (and/or swiped at a standard credit card terminal).

DETAILED DESCRIPTION OF THE EMBODIMENTS

Figure 1:
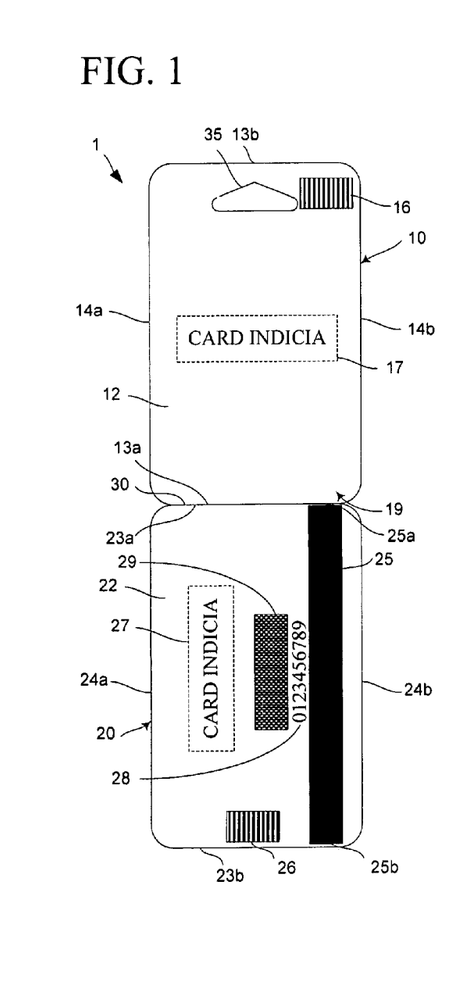
FIG. 1 illustrates a back view of a card assembly according to an embodiment of the invention.
Figure 2:
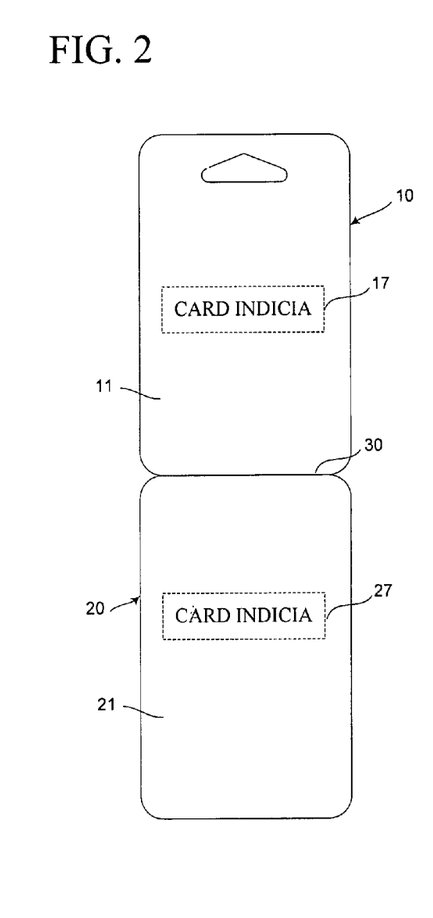
FIG. 2 illustrates a front view of the card assembly of FIG. 1.
Figure 3:
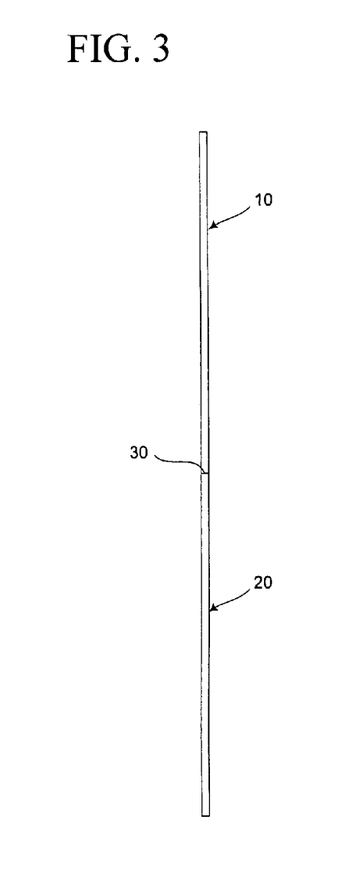
FIG. 3 illustrates a side view of the card assembly of FIG. 1.

FIGS. 1, 2 and 3 illustrate the back, front and side views, respectively, of a card assembly according to some embodiments of the invention. As shown in FIGS. 1-3, card assembly 1 may include a display portion 10 and transaction portion 20. Display portion 10 may comprise a generally planar member formed of a suitable material, such as plastic or paper sheet material, that has a front 11 and back 12. Likewise, transaction portion 20 may comprise a generally planar member formed of a suitable material, such as plastic or paper sheet material, that has a front 21 and back 22. In such embodiments, both display portion 10 and transaction portion 20 may have a generally rectangular shape with opposing long edges 14*a*, 14*b* and 24*a*, 24*b*, and opposing short edges, 13*a*, 13*b* and 23*a*, 23*b*, respectively. (It should be understood that generally rectangular cards, e.g., debit cards, may have rounded edges.)

Display portion 10 and transaction portion 20 may be detachably joined at short edge 13*a* of display portion 10 and short edge 23*a* of transaction portion 20 (or at other edges). Although the display portion 12 and the transaction portion 14 may be detachably joined in any suitable manner, in this embodiment, the display portion 10 and the transaction portion 20 are integrally formed into a single planar member of any suitable construction. Display portion 10 and transaction portion 20 may be separable at detachment joint 30, which may comprise a line of weakness that serves to facilitate separation of the two card portions such as by folding, breaking, cutting, ripping or tearing. The detachment joint 30, or line of weakness, may be formed in any suitable manner known in the art including, by way of example, scoring or perforating the card member. Accordingly, display portion 10 and transaction portion 20 may be arranged in an edge-to-edge relationship separated by detachment joint 30, or the line the weakness.

In other embodiments, display portion 10 and transaction portion 20 may be separately formed members that are detachably attached in one form or another. The detachment joint 30 in these embodiments may comprise any means of detachably coupling two objects together including, for example, an adhesive, thermal welding, a mechanical fastener, and a coupling device. (As used herein, the term "coupling interface" refers to the interface between the transaction portion and display portion where the two portions are coupled together. A coupling interface may comprise a detachment joint 30 or line of weakness, for example.)

Transaction portion 20 (and in some embodiments, the display portion 10) may comprise a prepaid service card or any standard card used for transactions, such as a credit, debit, stored value, or other card. A stored value card may be used to access one or more products or services, such as prepaid products or services, and it may be enabled by a PIN. Examples of services that may be accommodated by or accessed by stored value cards include: long distance telephone communication, wireless communication, paging and internet-enabled communication services, including wireless web access, emergency road service, legal service, accounting service, tax service, property cleaning and/or maintenance service, clothe/garment cleaning service, transportation service, travel service, delivery service, online (or off-line) dating service, electrical and/or gas service, water service, sewage service, internet access, and film processing (including digital film processing). Other examples of prepaid services and/or products that may be accessed by a stored value card include gift accounts, prepaid gas accounts, prepaid grocery accounts, prepaid entertainment accounts, prepaid movie accounts, downloadable ring tone accounts, downloadable game accounts, downloadable movie accounts, downloadable music accounts that use MP3, MP4, WMV, WAV, or other music formats, any other downloadable software account, customer rewards accounts, bridge and/or road toll accounts, and any other type of PIN-enabled stored value accounts for products, services, or both, that may be prepaid by the owner of the account. Any other type of stored value card product or service is contemplated herein.

In some embodiments, both display portion 10 and transaction portion 20 may be adapted to conform with ANSI and ISO specifications for transaction cards.

In some embodiments, transaction portion 20 may comprise an activation storage medium 25 that is applied to a surface of transaction portion 20. In such embodiments, activation storage medium 25 may comprise a machine-readable magnetic stripe, which is well known in the art and can be used for credit, debit, phone, or other transaction cards. Activation storage medium 25 may comprise a read-only magnetically encoded stripe encoding data in accordance with standard data encryption protocols readable by conventional transaction card reading devices.

Although as shown in FIG. 1 activation storage medium 25 is applied to back 22 of transaction portion 20, it will be understood that activation storage medium 25 may be applied in any suitable location on transaction portion 20, including, for example, front 21. Furthermore, activation storage medium 25 may be applied to transaction portion 20 using any suitable technique, including heat lamination, adhesives or printing techniques, for example.

Figure 4:
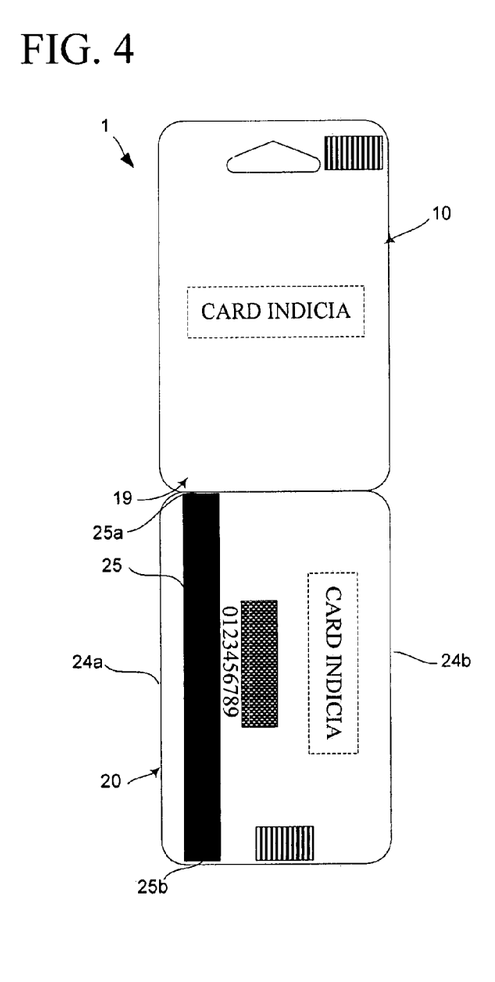
FIG. 4 illustrates a back view of the card assembly of FIG. 1 according to another embodiment of the invention.

Activation storage medium 25 may extend substantially along the length of transaction portion 20, such that short edges 25a and 25b of activation storage medium 25 may extend to short edges 23a and 23b of transaction portion 20, respectively. As shown in FIG. 1, activation storage medium 25 may be oriented along long edge 24b (or as shown in FIG. 4, along long edge 24a) of transaction portion 20 in a suitable manner so that transaction portion 20 complies with the ANSI and ISO standards for transaction cards, and/or so that it may be read by one or more merchant terminals without detaching transaction portion 20 from display portion 10. It will be understood that a merchant terminal may be any device equipped with an input apparatus for inputting or reading encoded card information, such as a magnetic stripe reader configured to read a magnetic stripe on a card, a barcode reader or keypad. Furthermore, as shown in FIG. 1, short edge 23b, (i.e., the opposing edge from the detachment joint 30 and the display portion 10), is free from attachment to any other portion or member. This arrangement allows for the activation storage medium 25 to be read in a standard push-pull (or ATM-like) card reader, which is popular in certain locales throughout the world.

As shown in FIGS. 1 and 4, the surface region 19 on back 12 of display portion 10 adjacent to detachment joint 30 and opposite of short edge 25a of activation storage medium 25 may be free of any machine-readable storage medium, including a magnetic stripe, that would interfere with the reading of activation storage medium 25 by a merchant terminal. This restricted-use surface region 19 may include the surface area that would be covered if the activation storage medium 25 extended onto display portion 10. Stated another way, the restricted-use region 19 would include the area that would be bounded if the upper and lower long edges of activation storage medium 25 extended over display portion 10. This restricted-use region 19 may extend only for a portion of display portion 10, or the length of display portion 10 between short edges 13a and 13b.

One purpose of restricting the use of the restricted-use region 19 is to avoid having a second magnetic stripe on the display portion 10 that might interfere with a magnetic stripe reader that is attempting to read a magnetic stripe disposed on the transaction portion 20. For example, in embodiments where the transaction portion 20 comprises a transaction card (e.g., a standard debit card) having a magnetic stripe that extends to the edge of the detachment joint 30 (and therefore also the edge of the display portion 10), the restricted-use region 19 may comprise the area where the magnetic stripe would occupy if it extended from the transaction portion 20 past the detachment joint 30 and across the length of display portion 10.

In some embodiments, other regions of the cards may have restricted uses. For instance, a region of either the display portion or the activation portion that is opposite to a machine-readable medium (such as a magnetic stripe) of the other portion may have restricted uses and be devoid of another similar machine-readable medium.

Figure 5:
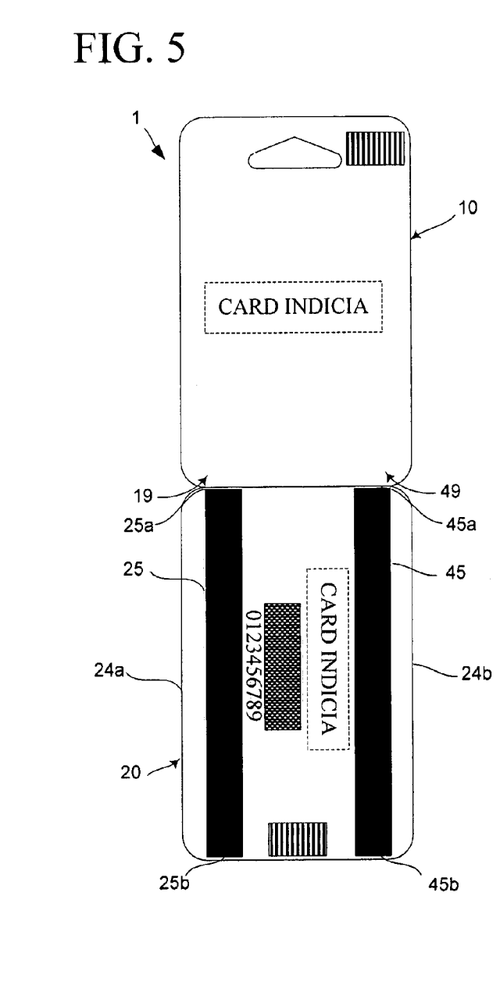
FIG. 5 illustrates a back view of the card assembly of FIG. 1 according to another embodiment of the invention.

In some embodiments of the invention, transaction portion 20 may include a second machine-readable storage medium 45 having short edges 45a and 45b, such as a second magnetic stripe. As shown in FIG. 5, activation storage medium 25 is oriented along long edge 24a and second machine-readable storage medium 45 is oriented along long edge 24b. Both media 25 and 45 extend substantially along the length of transaction portion 20, such that short edges 25a and 45a may extend to short edge 23a of transaction portion 20, and short edges 25b and 45b may extend to short edge 23b of transaction portion 20. Likewise, a second restricted-use region 49, similar to first restricted-use region 19, is located on the surface area on back 12 of display portion 10 adjacent to detachment joint 30 and opposite of short edge 45a of activation storage medium 45. Second restricted-use region 49 is free of any machine-readable storage medium, including a magnetic stripe, that would interfere with the reading of activation storage medium 45 by a merchant terminal.

Both media 25 and 45 may be located in a suitable manner so that either may comply with ANSI and ISO standards for transaction cards, and/or so that it may be read by one or more merchant terminals without detaching transaction portion 20 from display portion 10. Furthermore, second machine-readable storage medium 45 may have the same or different functionality as activation storage medium 25. In this embodiment, transaction portion 20 includes two storage media 25 and 45. Exemplary transaction cards that include multiple storage media are fully described in co-pending and commonly assigned U.S. patent application Ser. No. 10/835,320 entitled "Transaction Card Comprising Two Magnetic Stripes," which is incorporated herein by reference in its entirety.

Figure 6:
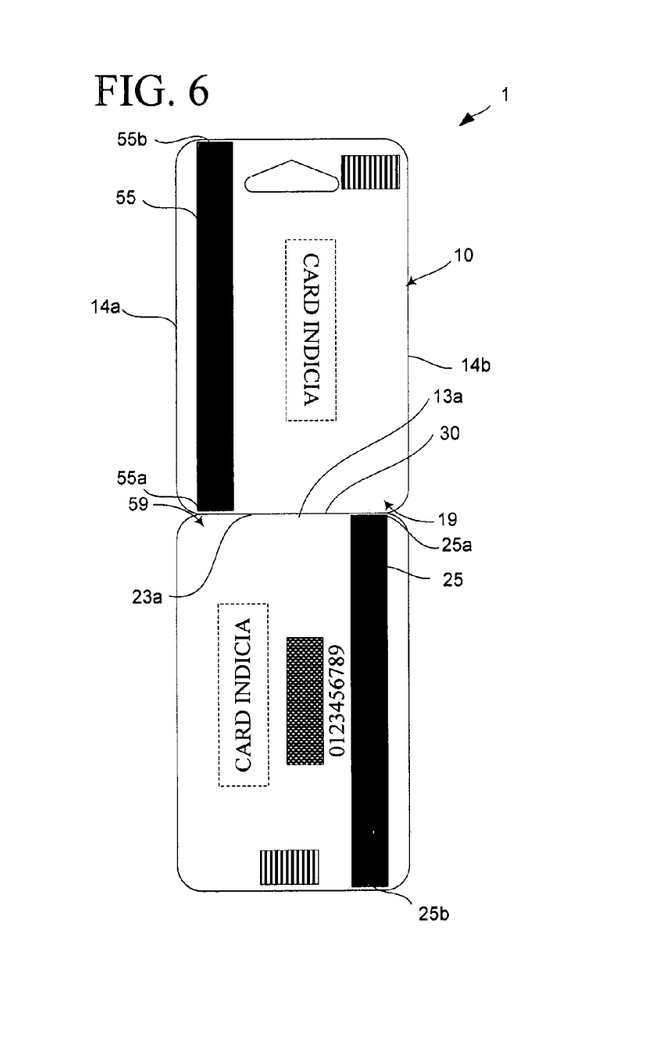
FIG. 6 illustrates a back view of the card assembly of FIG. 1 according to another embodiment of the invention.

In some embodiments, display portion 10 may also include a machine-readable storage medium 55. As shown in FIG. 6, machine-readable storage medium 55 may be oriented along long edge 14a, and may extend substantially along the length of display portion 10, such that short edges 55a and 55b may extend to short edges 13a and 13b of display portion 10, respectively. A third restricted-use region 59, similar to first restricted-use region 19, may be located on back 22 of transaction portion 20 adjacent to detachment joint 30 and opposite of short edge 55a of machine-readable storage medium 55. Third restricted-use region 59 may be free of any machine-readable storage medium, including a magnetic stripe, that would interfere with the reading of activation storage medium 55 by a merchant terminal. Both media 25 and 55 may be located in a suitable manner so that either may comply with ANSI and ISO standards for transaction cards, and/or so that it may be read by one or more merchant terminals without detaching transaction portion 20 from display portion 10. Furthermore, second machine-readable storage medium 55 may have the same or different functionality as activation storage medium 25.

Activation storage medium 25 may have activation data stored therein, the activation data comprising activation information. For instance, the activation data may be usable to activate the transaction portion 20 and/or an account associated with the card. For instance, the activation data may be activation information similar to that used to activate traditional phone cards or PINs, as well known in the art. The activation data may alternately (or in addition) comprise other transaction or account data, such as an account number, bank identification number ("BIN") and/or other routing code, PIN, and/or other data. The activation data may be any type of data as that disclosed for the transaction data; similarly, the transaction data may be any type of data as disclosed for the activation data. In some embodiments, the activation data and transaction data may be identical. Activation storage medium 25 may also be used to store, obtain, transmit or otherwise handle any type of information, such as text, biometrics information (such as eye scan or fingerprint information) and so on.

Activation storage medium 25 may also be adapted so as to be readable by merchant terminals (e.g., existing merchant terminals used for credit card transactions) during transactions where cardholders use the transaction portion 20 to purchase goods and/or services from the merchants. For instance, cardholders may use the transaction portion 20 to purchase a product from a merchant at a merchant terminal. It should be appreciated that a merchant terminal may be any terminal equipped with an input apparatus for inputting card information, such as a magnetic stripe reader configured to read a magnetic stripe on a card, or a barcode reader or keypad. The merchant terminal may also be any merchant terminal configured to read transaction card data, such as credit card data, as known in the art. As noted above, the card assemblies of the invention may be particularly suited for use with standard push-pull (or ATM-like) card readers, which are popular in certain locales throughout the world.

As shown in FIG. 1, transaction portion 20 further may include a card number 28 that is associated with an account associated with the transaction portion 20, as is well known in the art. In some embodiments, it may desirable to include a PIN or other security number with the transaction portion 20 to allow the card assembly purchaser to gain access to certain services following purchase of the product. Such PIN or other security number (not shown) may be printed on transaction portion 20, and may be hidden from general view by a removable surface 29, which may comprise a scratch-off material, a sticker, label or other means for making the PIN or security number not generally viewable. Thus, the purchaser can examine the card before purchase and determine that the PIN or security number has not been compromised. This will allow a consumer that purchases the card assembly 1 for use of the transaction portion 20 to feel safe that an unauthorized user will not gain access to the purchased service once the card has been activated. In other circumstances, such as when the removable surface 29, i.e., scratch-off material, sticker, label or other means for making the PIN or security number not generally viewable is still intact, this may allow return of the card assembly to a card retailer because it may not have been used.

Although the activation storage medium 25 (as shown in FIG. 1) comprises a magnetic stripe having machine readable data stored therein, it will be understood that other storage media may be used on either display portion 10 or transaction portion 20. For example, display portion 10 may include a barcode 16, and transaction portion 20 may include a barcode 26. Other storage media may be used, such as RFID, optical read-only memory, other magnetic memory, smartcard chip, printed number or code, or any other means of printing or storing information that may be attached to (or otherwise on or associated with) the card assembly.

Display portion 12 and transaction portion 14 may also have various card indicia 17 and 27, respectively. Such card indicia 17 and 27 may include issuer indicia, such as the issuer name, card name or card type indicia, (for example, a Platinum Rewards card, Gold card, debit card, gift card, or other type of card, validity indicia, such as indicia indicating the dates of validity or an expiration date, instructions for use of the card, advertising, coupon or rebate information, cardholder indicia, such as the cardholder's name or picture (which may be printed on during or after purchase), for example. Any or all of the indicia on card assembly 1 may be printed (e.g., embossed in raised lettering/numbering), stored, encoded, or otherwise marked on either the transaction portion 20 or display portion 10.

As shown in FIG. 1, display portion 10 may include a hanging aperture 35, e.g., for hanging the card on a J-hook or for otherwise hanging or storing the card in a store or other storage facility. It will be understood that in alternate embodiments such a hanging aperture may be located in transaction portion 20, or the card assembly 1 may not have such a hole.

It should also be appreciated that transaction portion 20 and display portion 10 may further comprise any or all of the following features: account numbers, dotted account numbers, unidentified account numbers, security codes (e.g., a 3-digit security code generally found on the back of a credit card), signature lines, signatures, authorized users, effective dates, expiry dates, signature strips, full shielding foils, local shielding foils, card holes, color code matchings, feature embossing, dedicated feature imaging, ghosting, issuer names, issuer codes, bar codes, serial numbers, logos, emblems, artworks, advertisings, holographs, identification pictures, passwords, personal identification numbers (PINs), identification numbers, personal information, biometric information, finger prints, retinal prints, facial prints, facial information, voice prints, instructions, telephone numbers, addresses, and internet addresses, alone or in combination.

It should be understood that while the terms "display portion" and "transaction portion" are used herein to describe the two portions 10, 20 of card assembly 1, the display portion 10 and transaction portion 20 may each have any one or more of a variety of functions, such as activating an account, transacting for value, adding value to an account, recharging an account, accessing account information, or any other financial-related function. The display portion 10 and transaction portion 20 may have a similar or identical function.

It will be understood that the card assembly 1 and the display and transaction portions 10, 20 may be of any convenient shape or dimension. By way of example, the transaction portion 20 may have the size, shape, and other physical characteristics of a credit card, debit card, phone card, other stored value card, or other transaction card. For instance, it may have the approximate (or exact) length, width, thickness, and physical makeup of a standard VISA/MasterCard/American Express/Discover credit or debit card, or an AT&T, MCI, or Bell Atlantic phone card. The transaction portion 20 may comply with industry standards, such as ANSI/ISO 7811 and ANSI/ISO 7813 for financial transaction cards. The transaction portion 20 may be smaller than the display portion 10, although it may otherwise have the same physical characteristics as the display portion 10. Alternately, the transaction portion 20 may have the physical characteristics (such as size and shape) of any other transaction card. Like the transaction portion 20, the display portion 10 may be substantially rectangular like a regular transaction card, and it may have rounded edges.

Figure 7:
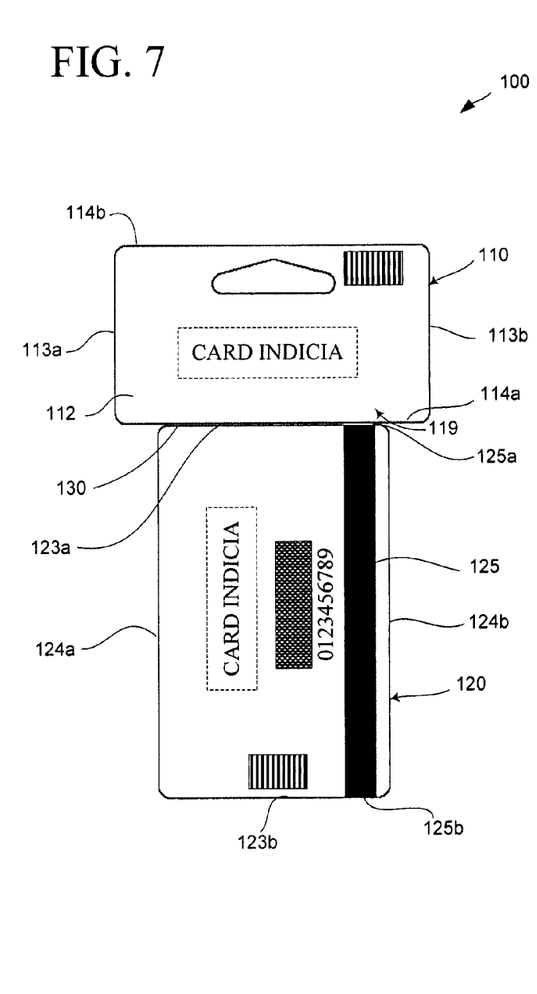
FIG. 7 illustrates a back view of a card assembly according to another embodiment of the invention.

FIG. 7 illustrates a back view of a card assembly according to some embodiments of the invention. As shown in FIG. 7, card assembly 100 may include many of the features shown and described above with reference to card assembly 1. Both display portion 110 and transaction portion 120 may have a generally rectangular shape with opposing long edges 114a, 114b and 124a, 124b, and opposing short edges, 113a, 113b and 123a, 123b, respectively. However, in this embodiment, display portion 10 and transaction portion 120 are detachably joined at long edge 114a of display portion 110 and short edge 123a of transaction portion 120. As above, display portion 110 and transaction portion 120 may be separable at detachment joint 130, which may comprise a line of weakness that serves to facilitate separation of the two card portions such as by folding, breaking, cutting, ripping or tearing. Accordingly, in this embodiment, display portion 110 and transaction portion 120 are arranged in an long edge-to-short edge relationship separated by detachment joint 130.

Transaction portion 120 may include an activation storage medium 125 that is applied to a surface of transaction portion 120. Activation storage medium 125 may extend substantially along the length of transaction portion 120, such that short edges 125a and 125b of activation storage medium 125 may extend to short edges 123a and 123b of transaction portion 120, respectively. As shown in FIG. 7, activation storage medium 125 may be oriented along long edge 124b (or in other embodiments, along long edge 124a) of transaction portion 120 in a suitable manner so that transaction portion 120 complies with the ANSI and ISO standards for transaction cards, and/or so that it may be read by one or more merchant terminals without detaching transaction portion 120 from display portion 110. Furthermore, as shown in FIG. 7, short edge 123b (i.e., the opposing edge from the detachment joint 130 and the display portion 110) may be free from attachment to any other portion or member.

The surface region 119 on back 112 of display portion 110 adjacent to detachment joint 130 and opposite of short edge 125a of activation storage medium 125 may be free of any machine-readable storage medium, including a magnetic stripe, that would interfere with the reading of activation storage medium 125 by a merchant terminal. This restricted-use surface region 119 may include the surface area that would be covered if the activation storage medium 125 extended onto display portion 110. Stated another way, the restricted-use region 119 would include the area that would be bounded if the upper and lower long edges of activation storage medium 125 extended over display portion 110. This restricted-use region 119 may extend only for a portion of display portion 110, or the length of display portion 110 between long edges 114a and 114b.

Figure 8:
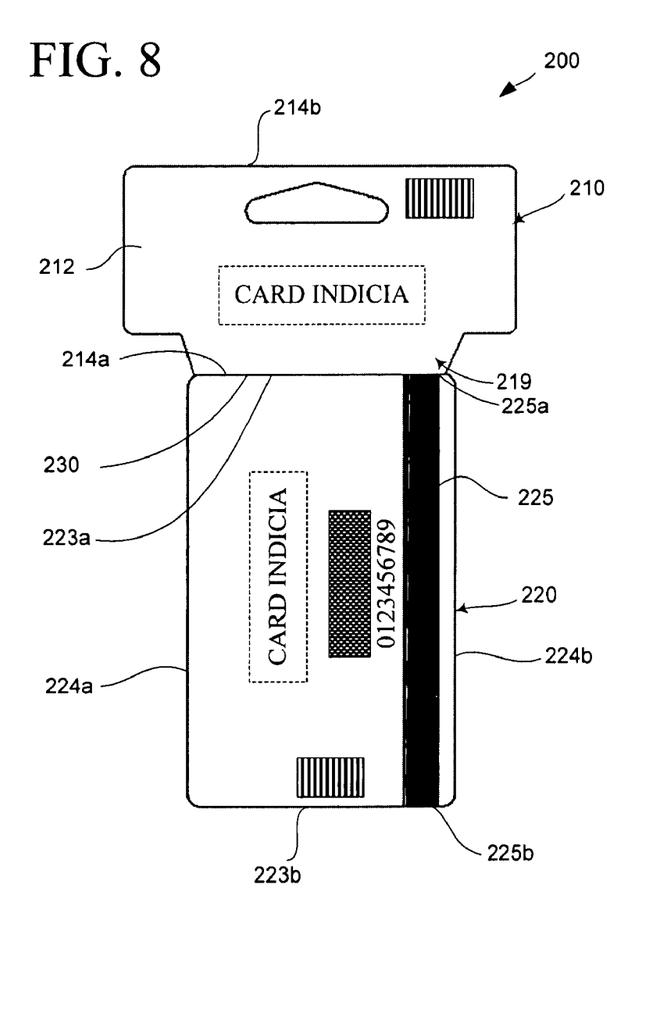
FIG. 8 illustrates a back view of a card assembly according to another embodiment of the invention.

FIG. 8 illustrates a back view of a card assembly according to another embodiment of the invention. As shown in FIG. 8, card assembly 200 may include many of the features shown and described above with reference to card assembly 1. However, in this embodiment, display portion 210 has a shoulder portion 212 that extends from the body of the display portion 210. The long edge 214a of shoulder portion 212 may be detachably joined to the short edge 223a of transaction portion 220. As above, display portion 210 and transaction portion 220 are separable at detachment joint 230, which also may comprise a line of weakness.

Transaction portion 220 may include an activation storage medium 225 that may be applied to a surface of transaction portion 220. Activation storage medium 225 extends substantially along the length of transaction portion 220, such that short edges 225a and 225b of activation storage medium 225 may extend to short edges 223a and 223b of transaction portion 220, respectively. As shown in FIG. 8, activation storage medium 225 may be oriented along long edge 224b (or in other embodiments, along long edge 224a) of transaction portion 220 in a suitable manner so that transaction portion 220 complies with the ANSI and ISO standards for transaction cards, and/or so that it may be read by one or more merchant terminals without detaching transaction portion 220 from display portion 210. Furthermore, as shown in FIG. 8, short edge 223b (i.e., the opposing edge from the detachment joint 230 and the display portion 210) may be free from attachment to any other portion or member.

The surface region 219 on back 212 of display portion 210 adjacent to detachment joint 230 and opposite of short edge 225a of activation storage medium 225 may be free of any machine-readable storage medium, including a magnetic stripe, that would interfere with the reading of activation storage medium 225 by a merchant terminal. This restricted-use surface region 219 may include the surface area that would be covered if the activation storage medium 225 extended onto display portion 210. Stated another way, the restricted-use region 219 would include the area that would be bounded if the upper and lower long edges of activation storage medium 225 extended over display portion 210. This restricted-use region 219 may extend only for a portion of display portion 210, or the length of display portion 210 between long edges 214a and 214b.

In each of the embodiments described above, the region of the display portion adjacent to the detachment joint and opposite of the short edge of activation storage medium may be free of any machine-readable storage medium, including a magnetic stripe, that would interfere with the reading of the activation storage medium by a merchant terminal. This restricted-use region may include the surface area that would be covered if the activation storage medium extended onto the display portion. Stated another way, the restricted-use region would include the area that would be bounded if the upper and lower long edges of activation storage medium extended over the display portion. This restricted-use region may extend only for a portion of the display portion (or transaction portion, in some embodiments), or the length of the display portion between its short edges.

As stated above, the transaction portions of the various card assemblies of the invention may be activated at a point-of-sale by a remote system and method for receiving activation data from a merchant terminal via a communications network. For instance, a merchant terminal may swipe a magnetic stripe on the transaction portion of a card assembly, read activation data from the card, and pass the activation data to an activation processor. It should be appreciated that such a system may also be used for host to host activation, or other types of activation. For instance, card activation or transactions may occur over a merchant's private network (e.g., a closed network) or at the terminal itself rather than over an open network. It should be appreciated that any card-related transaction is contemplated herein, including any kind of card activation, recharge, deactivation, or the like.

The embodiments of the present inventions are not to be limited in scope by the specific embodiments described herein. Indeed, numerous variations, changes, substitutions and equivalents will be apparent to those skilled in the art from the foregoing description and accompanying drawings. For instance, it should be understood that while magnetic stripes are used as an example herein, other machine-readable media such as barcodes are contemplated herein. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, it is intended that all subject matter described herein and shown in the accompanying drawings be regarded as illustrative only and not in a limiting sense and that the scope of the invention be solely determined by the appended claims. Also, the claims set forth below should be construed in view of the full breadth and spirit of the embodiments of the present inventions as disclosed herein.

What is claimed is:

1. A card assembly comprising:
    a display portion comprising a substantially planar substrate; and
    a transaction card comprising a substantially rectangular and substantially planar substrate having first and second short edges and first and second long edges, the transaction card further comprising at least one magnetic stripe having a card identification number encoded thereon, the at least one magnetic stripe being substantially parallel to the long edges,
    wherein the transaction card is detachably coupled to the display portion at a coupling interface located along one of the short edges.

2. The card assembly of claim 1, wherein the display portion and transaction card are integrally formed as a single planar member.

3. The card assembly of claim 2, wherein the coupling interface comprises a line of weakness that serves to facilitate separation of the display portion from the transaction card by folding, breaking, cutting, ripping or tearing.

4. The card assembly of claim 2, wherein the line of weakness is formed by perforating the single planar member.

5. The card assembly of claim 2, wherein the line of weakness is formed by scoring the single planar member.

6. The card assembly of claim 1, wherein the machine-readable magnetic stripe is readable by credit and debit card readers.

7. The card assembly of claim 1, wherein the display portion further includes a restricted-use surface area adjacent to the detachment joint and opposite to the transaction storage medium, wherein the restricted-use surface area comprises a region of the display portion where the magnetic stripe would overlap the display portion if the magnetic stripe extended across the detachment joint onto the display portion.

8. The card assembly of claim 7, wherein the restricted-use surface area is free of any machine-readable storage medium.

9. The card assembly of claim 1, wherein the card assembly comprises at least one first machine-readable storage medium, the at least one first machine-readable activation storage medium being the at least one magnetic stripe, further comprising:
    at least one second machine-readable storage medium.

10. The card assembly of claim 9, wherein the at least one second machine readable storage medium has activation data stored therein, wherein the activation storage data is associated in a database with an account.

11. The card assembly of claim 9, wherein the account is associated with the card identification number.

12. The card assembly of claim 9, wherein the at least one second machine-readable storage medium comprises at least one second magnetic stripe.

13. The card assembly of claim 9, wherein the at least one second machine-readable storage medium comprises a barcode having a product identification number encoded thereon.

14. The card assembly of claim 9, wherein the activation storage medium is disposed on the display portion.

15. The card assembly of claim 9, wherein the activation storage medium is disposed on the transaction card.

16. The card assembly of claim 1, wherein the activation portion comprises a hanging aperture configured for hanging the card assembly in a merchant display.

17. The card assembly of claim 1, wherein the display portion and the transaction card each have a substantially rectangular shape.

18. The card assembly or claim 17, wherein the transaction card and the display portion are comprised of substantially the same substrate, and wherein the display portion and the transaction card have substantially the same length, width, and thickness.

19. A method of activating a card assembly, comprising:
    displaying a card assembly in a merchant store, wherein the card assembly comprises:
        a display portion comprising a substantially rectangular and substantially planar substrate and a hanging aperture for hanging the card assembly in a merchant store display;
        a transaction card comprising a substantially planar substrate having first and second short edges and first and second long edges, and comprising at least one magnetic stripe having a card identification number encoded thereon, the at least one magnetic stripe being substantially parallel to the long edges, wherein the transaction card is detachably coupled to the display portion at a coupling interface located along one of the short edges;
    inputting the card identification number into a merchant terminal, wherein the act of inputting comprises inserting the transaction card into a magnetic stripe reader so that at least one of the short edges and at least ¼ of each of the long edges are inside the card reader, and wherein the act of inserting occurs while the transaction card is coupled to the display portion; and
    passing a request to activate the transaction card to a central processor, wherein the request comprises the card identification number to a central processor.

20. A card assembly comprising:

a display portion comprising a substantially planar substrate; and a transaction card comprising a substantially rectangular and substantially planar substrate having first and second short edges and first and second long edges, and further comprising a first machine-readable storage medium comprising a magnetic stripe having a card identification number encoded thereon, the magnetic stripe being substantially parallel to the short edges, the transaction card and the display portion being comprised of substantially the same substrate and being integrally formed as a single planar member, the transaction card being detachably coupled to the display portion at a line of weakness located along one of the short edges; and a second machine-readable storage medium disposed on at least one of the display portion and transaction card and comprising at least one of a magnetic stripe and a barcode.

* * * * *